(12) United States Patent
Beuth et al.

(10) Patent No.: US 12,618,971 B2
(45) Date of Patent: May 5, 2026

(54) ACTIVE OPTICAL SENSOR SYSTEM COMPRISING A LIGHT SOURCE, AT LEAST ONE OPTICAL DETECTOR, AN OPTICAL FILTER ELEMENT, AND A TEMPERATURE REGULATION APPARATUS WITH TEMPERATURE REGULATION

(71) Applicant: Valeo Schalter und Sensoren GmbH, Bietigheim-Bissingen (DE)

(72) Inventors: Thorsten Beuth, Bietigheim-Bissingen (DE); Sercan Cabuk, Bietigheim-Bissingen (DE); Helge Ketelsen, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 1110 days.

(21) Appl. No.: 17/637,294

(22) PCT Filed: Aug. 26, 2020

(86) PCT No.: PCT/EP2020/073795
§ 371 (c)(1),
(2) Date: Feb. 22, 2022

(87) PCT Pub. No.: WO2021/037879
PCT Pub. Date: Mar. 4, 2021

(65) Prior Publication Data
US 2022/0283275 A1 Sep. 8, 2022

(30) Foreign Application Priority Data
Aug. 26, 2019 (DE) ..................... 10 2019 122 774.7

(51) Int. Cl.
*G01S 7/481* (2006.01)
*G01S 7/497* (2006.01)
(Continued)

(52) U.S. Cl.
CPC ............ *G01S 17/08* (2013.01); *G01S 7/4817* (2013.01); *G01S 7/497* (2013.01); *G01S 17/02* (2013.01); *G01S 17/931* (2020.01)

(58) Field of Classification Search
CPC .......... G01S 7/48; G01S 7/4808; G01S 7/481; G01S 7/4814; G01S 7/4816;
(Continued)

(56) References Cited

U.S. PATENT DOCUMENTS 6,822,986 B2 * 11/2004 Nasu ..................... H01S 5/0687
372/98
6,969,855 B2 * 11/2005 Remillard ........... H01S 5/06804
250/330

(Continued)

FOREIGN PATENT DOCUMENTS

| CN | 102224431 A | 10/2011 |
| CN | 103703700 A | 4/2014 |

(Continued)

OTHER PUBLICATIONS

The Notice of Reasons for Rejection issued in Japanese Patent Application No. 2022-513301, mailed on Dec. 23, 2022 (10 pages).
(Continued)

*Primary Examiner* — Allen C. Ho
(74) *Attorney, Agent, or Firm* — Osha Bergman Watanabe & Burton LLP

(57) ABSTRACT

An active optical sensor system (1) with temperature regulation comprises a light source (2), configured to emit light (3) in the direction of an object (4), at least one optical detector (5), configured to detect portions (6) of the light (3) reflected from the object (4), and an optical filter element (7) arranged in a reception beam path for the reflected portions (6). The sensor system (1) comprises a temperature regulating device (8), configured to regulate a source temperature
(Continued)

of the light source (2) depending on a filter temperature of the filter element (7).

13 Claims, 2 Drawing Sheets

(51) Int. Cl.

| | |
|---|---|
| *G01S 17/02* | (2020.01) |
| *G01S 17/08* | (2006.01) |
| *G01S 17/931* | (2020.01) |

(58) Field of Classification Search
CPC ........ G01S 7/4817; G01S 7/497; G01S 17/02; G01S 17/04; G01S 17/06; G01S 17/08; G01S 17/88; G01S 17/89; G01S 17/93; G01S 17/931
USPC ..... 356/3, 3.02, 3.03, 3.04, 3.06, 4.01, 4.07, 356/9, 10
See application file for complete search history.

(56) References Cited

U.S. PATENT DOCUMENTS

| | | | | |
|---|---|---|---|---|
| 7,276,696 | B2 * | 10/2007 | Remillard | H01S 5/06804 |
| | | | | 250/330 |
| 7,423,750 | B2 * | 9/2008 | Hoshizaki | F21V 29/677 |
| | | | | 436/172 |
| 7,692,772 | B2 * | 4/2010 | Kase | G01S 17/10 |
| | | | | 356/5.1 |
| 7,724,354 | B2 * | 5/2010 | Drodofsky | H01S 3/005 |
| | | | | 356/28 |
| 8,477,296 | B2 * | 7/2013 | Donlagic | G01N 21/00 |
| | | | | 356/73.1 |
| 10,003,168 | B1 * | 6/2018 | Villeneuve | G01S 7/4818 |
| 10,302,492 | B2 * | 5/2019 | Weber | G01J 3/027 |
| 10,591,600 | B2 * | 3/2020 | Villeneuve | H01S 3/094042 |
| 11,367,990 | B2 * | 6/2022 | Eichenholz | H01S 3/0912 |
| 11,467,286 | B2 * | 10/2022 | Finkelstein | G01S 17/10 |
| 11,480,665 | B2 * | 10/2022 | Hattass | G01S 7/497 |
| 11,561,285 | B2 * | 1/2023 | Schwarz | G01S 7/4817 |
| 11,726,184 | B2 * | 8/2023 | Ferreira | G01S 7/4815 |
| | | | | 356/4.01 |
| 11,762,151 | B2 * | 9/2023 | Takahashi | G01S 17/89 |
| | | | | 356/5.01 |
| 11,947,048 | B2 * | 4/2024 | Schleuning | G01S 7/4811 |
| 11,947,050 | B2 * | 4/2024 | Lu | G01S 7/481 |
| 2003/0043865 | A1 | 3/2003 | Nasu et al. | |
| 2008/0218729 | A1 | 9/2008 | Kase | |
| 2019/0078934 | A1 | 3/2019 | Weber | |

FOREIGN PATENT DOCUMENTS

| | | |
|---|---|---|
| CN | 208239618 U | 12/2018 |
| CN | 110520752 A | 11/2019 |
| DE | 4424717 A1 | 1/1996 |
| DE | 102018201506 A1 | 8/2019 |
| DE | 102018201507 A1 | 8/2019 |
| DE | 102018128630 A1 | 5/2020 |
| EP | 1967865 A1 | 9/2008 |
| JP | 2003060294 A | 2/2003 |
| JP | 2008-224239 A | 9/2008 |
| JP | 2011117849 A | 6/2011 |
| JP | 5103953 B2 | 12/2012 |
| JP | 2018-535438 A | 11/2018 |
| JP | 2020-112400 A | 7/2020 |

OTHER PUBLICATIONS

Office Action issued in counterpart Korean Patent Application No. 10-2022-7009939 mailed Mar. 20, 2024 (23 pages).

International Search Report and Written Opinion in corresponding International Application No. PCT/EP2020/073795, mailed Dec. 2, 2020 (11 pages).

German Search Report issued in corresponding German Application No. 10 2019 122 774.7, dated Sep. 21, 2021 (13 pages).

Office Action issued in counterpart Chinese Patent Application No. 202080067344.8 mailed Oct. 26, 2024 (13 pages).

Second Office Action in corresponding Chinese Application No. 202080067344.8, dated May 7, 2025 (15 pages).

* cited by examiner

ACTIVE OPTICAL SENSOR SYSTEM COMPRISING A LIGHT SOURCE, AT LEAST ONE OPTICAL DETECTOR, AN OPTICAL FILTER ELEMENT, AND A TEMPERATURE REGULATION APPARATUS WITH TEMPERATURE REGULATION

The present invention relates to an active optical sensor system with temperature regulation, which has a light source, which is configured to emit light in the direction of an object, and an optical detector, which is configured to detect components of the light reflected by the object, and an optical filter element, which is arranged in a receiving beam path for the reflected components of the light. The invention further relates to a corresponding method for regulating the temperature of an active optical sensor system.

Active optical sensor systems, such as lidar systems, can be mounted on motor vehicles in order to realize various functions of electronic vehicle guidance systems or driver assistance systems. These functions include distance measurements, distance control algorithms, lane keeping assistants, object tracking functions, and so on.

An active optical sensor system has a light source for emitting light and an optical detector for receiving reflected components of the light. When the ambient temperature increases, these components of the sensor system heat up, which can lead to mechanical expansion and/or to changes in internal physical parameters of the components. This can result in a shift of an emission wavelength of the light source and/or of a transmission spectrum of a filter element arranged in the receiving beam path. As a rule, however, the shift is different for the filter element and the light source, with the result that, in known active optical sensor systems, filter elements with a very wide transmission range depending on the wavelength are used to ensure that the light having the emission wavelength of the light source is transmitted by the filter element with sufficiently high intensity even when temperature fluctuations occur.

However, the larger the wavelength range in which the filter element has a high transmission is, the greater is the influence of noise, for example due to ambient light. This leads to a reduced signal-to-noise ratio and accordingly to a reduced accuracy and reliability of the measurement results of the active optical sensor system.

Against this background, it is an object of the present invention to specify an improved concept for an active optical sensor system which leads to a lower influence of noise or to an increased signal-to-noise ratio.

According to the invention, this object is achieved by the respective subject matter of the independent claims. Advantageous developments and preferred embodiments are the subject matter of the dependent claims.

The improved concept is based on the idea of regulating a source temperature of a light source of the sensor system in dependence on a filter temperature of a filter element of the sensor system.

According to an independent aspect of the improved concept, an active optical sensor system with temperature regulation is specified. The sensor system has a light source, which is configured to emit light in the direction of an object, in particular of an object that is located in the surrounding area of the sensor system. The sensor system has at least one optical detector, which is configured to detect components of the light reflected by the object, and an optical filter element, which is arranged in a receiving beam path for the reflected components of the light. The sensor system has a temperature regulation apparatus, which is configured to regulate a source temperature of the light source in dependence on a filter temperature of the filter element.

The light source can in particular be designed as a laser, for example as a laser diode.

The sensor system can in particular be designed as a lidar system.

The at least one detector can be designed, for example, as a photodiode, in particular as an avalanche photodiode.

Here and below, the term "light" can be understood to comprise electromagnetic waves in the visible range, infrared range, and/or ultraviolet range. Accordingly, the term "optical" can also be understood to relate to light in this sense.

The light which is emitted by the light source is preferably infrared light. An emission wavelength, that is to say a maximum of the emission spectrum of the light source, therefore lies in the infrared spectral range, for example at 905 nm or 1200 nm.

The filter element can be designed, for example, as a bandpass filter, wherein the emission wavelength of the light source is within a transmission band of the bandpass filter.

The filter element being arranged in the receiving beam path means in particular that light which is incident on an active surface of the at least one optical detector from outside the sensor system has passed through the optical filter element.

The source temperature can be a temperature in the immediate surrounding area of the light source, for example a temperature of a housing of the light source or a temperature of a heat sink, i.e. a cooling body on which the light source is arranged or to which the light source is connected in order to be cooled. It can also be a temperature of the light source itself, that is to say, for example, a barrier layer temperature of the laser diode or a temperature of a circuit carrier or of a printed circuit board on which the light source or the laser diode is mounted.

The filter element serves in particular for selectively receiving the reflected components of the light emitted by the light source by means of the at least one detector and for suppressing other light, for example ambient light, as far as possible in order to reduce the influence of noise during a measurement by means of the sensor system. Accordingly, the transmission spectrum of the filter element is matched to the emission wavelength of the light source, with the result that the emission wavelength lies, at least at a specified reference temperature, within a transmission band or transmission range of the filter element.

The filter temperature can be a temperature of the filter element or a temperature in the immediate surrounding area of the filter element.

In particular, the temperature regulation apparatus is configured to determine the filter temperature and to determine a setpoint value for the source temperature based on the determined filter temperature, for example by means of a look-up table. The temperature regulation apparatus then regulates the source temperature to the setpoint value.

In particular, the source temperature being regulated in dependence on the filter temperature can be understood to mean that the source temperature is regulated to a setpoint value that depends on the filter temperature.

By changing the filter temperature, in particular with respect to a specified nominal temperature for the filter element, that is to say a temperature for which a transmission spectrum of the optical filter element is specified, the transmission spectrum is shifted and/or changed.

Since the emission wavelength and the transmission spectrum of the filter element are matched to one another, it is possible without temperature regulation according to the improved concept that the emission wavelength of the light source moves out of the transmission band or transmission range of the filter element or at least moves out of a range of maximum transmission. This would lead to a partial or complete suppression of light having a wavelength corresponding to the emission wavelength. A meaningful measurement would no longer be possible. Without the improved concept, this problem can be addressed in that the transmission band of the filter element is selected to be correspondingly wide, so that the emission wavelength always lies within the transmission band of the filter element even if strong temperature fluctuations occur.

According to the improved concept, however, the filter-temperature-dependent regulation of the source temperature ensures that the emission wavelength can be tracked in a controlled manner to a shift of the transmission spectrum of the filter element. Consequently, it is possible to achieve the result that the emission wavelength is always in a desired range of the transmission spectrum, that is to say in particular in the transmission band and thus in the range of maximum transmission of the filter element.

This makes it possible to significantly restrict the width of the transmission band or the transmission range of the filter element, since the temperature-dependent shift is already taken into account by the temperature regulation according to the improved concept.

By selecting a filter element with a lower transmission width or bandwidth, it is possible to improve the signal-to-noise ratio for the measurement by means of the sensor system, since a correspondingly larger component of light having irrelevant wavelengths can be blocked out. As a consequence, this leads to a more precise and reliable measurement.

According to the improved concept, the source temperature in particular is regulated in dependence on the filter temperature. In material systems typically used for the light source and the filter element, a temperature-dependent shift in the emission wavelength is, for example, significantly more pronounced than the temperature-dependent shift in the transmission spectrum of the filter element. Therefore, by regulating the source temperature, only a smaller temperature adjustment by the temperature regulation apparatus is necessary than would be the case if, instead of the source temperature, the filter temperature were regulated in dependence on the source temperature.

According to at least one embodiment of the active optical sensor system, the sensor system has a processing unit, which is configured to generate a scanning point of the object in dependence on a detector signal, wherein the at least one detector is configured to generate the detector signal in dependence on the detected reflected components of the light.

The scanning point can contain, for example, coordinates, in particular three-dimensional spatial coordinates, of a corresponding point on the object, and possibly, in particular when the sensor system is embodied as a LIDAR system, an intensity of the detected reflected light. Based on the intensity, if the emission wavelength is known, conclusions can be drawn about the spectral properties of the object, for example its color.

The measurement by means of the sensor system can in particular be understood to mean generating the scanning point or a plurality of scanning points in the manner described.

According to at least one embodiment, the temperature regulation apparatus contains a first temperature sensor, which is configured and arranged to generate a first sensor signal that is dependent on the filter temperature. The temperature regulation apparatus contains a second temperature sensor, which is configured and arranged to generate a second sensor signal that is dependent on the source temperature. The temperature regulation apparatus is configured to regulate the source temperature in dependence on the first and the second sensor signal.

According to at least one embodiment, the temperature regulation apparatus, in particular a control unit of the temperature regulation apparatus, is configured to determine the setpoint value for the source temperature in dependence on the first sensor signal and to regulate the source temperature to the setpoint value in dependence on the second sensor signal.

The first sensor signal or the setpoint value is therefore used in particular as a reference variable for the regulation, while the second sensor signal represents a regulation variable of the regulation loop.

According to at least one embodiment, the temperature regulation apparatus contains a temperature regulation element arranged in the surrounding area of the light source and a control unit, which is configured to control the temperature regulation element in dependence on the filter temperature in order to regulate the source temperature.

The temperature regulation element can in particular be designed as a cooling element, as a heating element or as a cooling and heating element, for example as a Peltier element. The temperature regulation element can also contain a cooling element and a heating element.

The temperature regulation element can contain, for example, an actively coolable heat sink or an actively coolable cooling body. For example, the temperature regulation element can be attached or connected to a passive cooling body or a passive heat sink of the light source in order to form the active heat sink.

The control unit is configured in particular to control the temperature regulation element in dependence on the first and the second sensor signal in order to regulate the source temperature.

A control signal for activating the temperature regulation element generated by the control unit can in particular be viewed as a manipulated variable of the regulation.

In particular, the control unit is configured to determine as the control signal a difference signal based on the second sensor signal and the setpoint value and to control the temperature regulation element in dependence on the difference signal in order to regulate the source temperature to the setpoint value.

According to at least one embodiment, the temperature regulation element contains at least one Peltier element.

This makes energy-efficient cooling and easy regulatability of the source temperature possible. In addition, a simple change from cooling to heating or vice versa is possible by reversing a current direction for operating the Peltier element.

According to at least one embodiment, the temperature regulation apparatus, in particular the control unit and the temperature regulation element, is/are configured to regulate the source temperature in dependence on a specified first parameter, which describes a temperature-dependent shift in a characteristic wavelength of the light source, in particular the emission wavelength.

The first parameter is, in particular, a material parameter or structural-component parameter of the light source. The first parameter can be specified in m/K or nm/K, for example. The first parameter can be referred to, for example, as the drift of the emission wavelength in dependence on the source temperature or as a wavelength shift of the light source.

The wavelength shift of the light source depending on the temperature when using a laser or a laser diode as the light source is, for example, due to the fact that when the laser diode is heated, a band gap of the active material is reduced, with the result that the correspondingly emitted photons have a lower energy and consequently a higher wavelength.

The first parameter can be taken into account in the look-up table, for example, in that the first parameter is taken into account when assigning a corresponding shift in the emission wavelength to a given deviation of the source temperature from a specified nominal temperature for the light source.

Alternatively or additionally, the control unit can be configured to calculate the setpoint value in dependence on the first parameter and the measured filter temperature. For example, the control unit can be configured to calculate a wavelength shift of the filter element based on a difference between the filter temperature and the nominal temperature for the filter element and to calculate the setpoint value for the source temperature in dependence on a ratio of the wavelength shift of the filter element to the first parameter.

In this way, partial or complete compensation of the wavelength shift of the light source relative to the transmission spectrum of the filter element is possible.

According to at least one embodiment, the temperature regulation apparatus, in particular the control unit and the temperature regulation element, is/are configured to regulate the source temperature in dependence on a specified second parameter, which describes a temperature-dependent shift of at least one characteristic wavelength, in particular the transmission spectrum, of the filter element.

The at least one characteristic wavelength of the filter element can, as described, contain the entire transmission spectrum or part of the transmission spectrum of the filter element or one or more cut-off wavelengths of the transmission spectrum, in particular of the transmission band of the filter element, or one or more other distinctive wavelengths of the transmission spectrum of the filter element.

In particular, the second parameter can be taken into account in the above-described assignment in the look-up table.

Alternatively or additionally, the control unit can be configured to calculate the setpoint value for the source temperature in dependence on the second parameter, the first parameter and the measured filter temperature. In particular, the shift in the characteristic wavelength of the filter element can be given by a product of the deviation of the filter temperature from the nominal temperature for the filter element and the second parameter.

The second parameter can be referred to, for example, as a temperature-dependent wavelength shift or band shift of the filter element, in particular of the transmission spectrum of the filter element. The second parameter can likewise be specified in units of m/K or nm/K.

According to at least one embodiment, the first parameter is greater than the second parameter, for example greater than or equal to five times the second parameter.

According to at least one embodiment, the temperature regulation apparatus, in particular the control unit and the temperature regulation element, is/are configured to regulate the source temperature in dependence on the filter temperature in such a way that a temperature-dependent shift in the at least one characteristic wavelength of the filter element is compensated by a temperature-dependent shift in the characteristic wavelength of the light source.

The fact that the designated wavelength shifts are compensated can in particular be understood to mean that both wavelength shifts are the same or approximately the same.

As a result of the compensation, the bandwidth of the filter element can be selected to be narrower, which leads to an increase in the signal-to-noise ratio.

According to at least one embodiment, the filter element has a layer or coating arranged on an active surface of the at least one optical detector, in particular directly on the active surface.

According to at least one embodiment, the layer or coating contains a polymer material or a glass.

According to at least one embodiment, the filter element is designed as a bandpass filter. At a specified reference temperature, the emission wavelength of the light source lies within the transmission band of the bandpass filter. In particular, the emission wavelength lies within the transmission band when the source temperature is the same as the nominal temperature for the light source and the filter temperature is the same as the nominal temperature for the filter element.

Regulating the source temperature by means of the improved concept can result in particular in the fact that the emission wavelength lies within the transmission band even at temperatures deviating from the nominal temperatures, in particular at different ambient temperatures of the sensor system.

According to a further independent aspect of the improved concept, a motor vehicle having an active optical sensor system according to the improved concept is specified.

According to a further independent aspect of the improved concept, a method for regulating the temperature of an active optical sensor system is specified. The sensor system has a light source to emit light in the direction of an object, at least one optical detector to detect components of the light reflected by the object, and an optical filter element, which is arranged in a receiving beam path for the reflected components of the light. According to the method for temperature regulation, a source temperature of the light source is regulated, in particular by means of a temperature regulation apparatus of the sensor system, in dependence on a filter temperature of the filter element.

According to at least one embodiment of the method according to the improved concept, a first sensor signal that is dependent on the filter temperature is generated, in particular by means of a first temperature sensor. A second sensor signal that is dependent on the source temperature is generated, in particular by means of a second temperature sensor. The source temperature is regulated by means of the temperature regulation apparatus in dependence on the first and the second sensor signal.

According to at least one embodiment, a setpoint value for the source temperature is determined by means of the temperature regulation apparatus in dependence on the first sensor signal, and the source temperature is regulated to the setpoint value in dependence on the second sensor signal.

According to at least one embodiment, the source temperature is regulated by means of the temperature regulation apparatus in dependence on a specified first parameter, which describes a temperature-dependent shift in a characteristic wavelength of the light source.

According to at least one embodiment, the source temperature is regulated by means of the temperature regulation apparatus in dependence on a specified second parameter, which describes a temperature-dependent shift in at least one characteristic wavelength of the filter element.

According to at least one embodiment, a temperature-dependent shift in at least one characteristic wavelength of the filter element is compensated by generating a corresponding shift in a characteristic wavelength of the light source by regulating the source temperature.

Further embodiments of the method according to the improved concept result directly from the various embodiments of the active optical sensor system according to the improved concept and vice versa. In particular, a sensor system according to the improved concept can be configured to carry out a method according to the improved concept, or a sensor system according to the improved concept carries out a method according to the improved concept.

Further features of the invention are evident from the claims, the figures and the description of the figures. The features and combinations of features that are cited in the description above and also the features and combinations of features that are cited in the description of the figures below and/or shown in the figures alone can be used not only in the respectively indicated combination but also in other combinations without departing from the scope of the invention. Embodiments of the invention that are not explicitly shown and explained in the figures, but emerge and are producible from the explained embodiments by virtue of separate combinations of features, are therefore also intended to be regarded as encompassed and disclosed. Embodiments and combinations of features which therefore do not have all the features of an originally formulated independent claim are also intended to be regarded as disclosed. Furthermore, embodiments and combinations of features that go beyond or differ from the combinations of features set out in the back-references of the claims are intended to be regarded as disclosed, in particular by the embodiments set out above.

In the drawings:

FIG. 1 shows an exemplary embodiment of an active optical sensor system 1 according to the improved concept.

Figure 1:
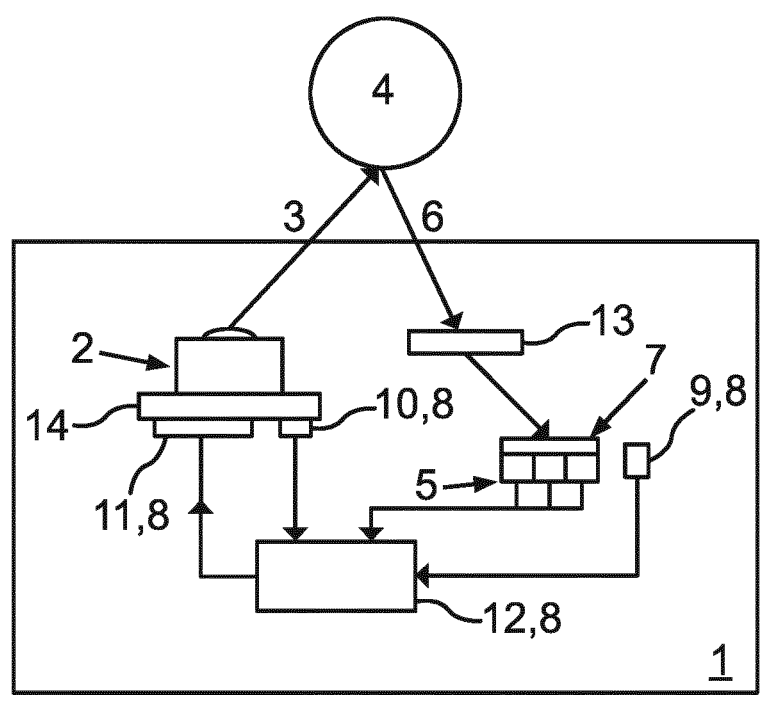
FIG. 1 shows a schematic illustration of an exemplary embodiment of an active optical sensor system according to the improved concept.

The sensor system 1 has a light source 2, which can be designed in particular as an infrared laser diode. The light source 2 can emit light 3 into a surrounding area of the sensor system 1, where it can be at least partially reflected by an object 4 so that reflected light components 6 are incident on the sensor system 1.

The sensor system 1 additionally has one or more optical detectors 5, which can be configured, for example, as avalanche photodiodes arranged next to one another.

An optical filter element 7, for example designed as a glass-containing or polymer-containing layer, is arranged on an active optical surface of the detectors 5. The filter element 7 is designed in particular as a bandpass filter.

The detectors 5 can detect the reflected light components 6 and, based thereon, generate one or more detector signals. Furthermore, the sensor system 1 contains a control unit 12, which is coupled to the detectors 5 in order to receive and process the detector signals generated by the detectors 5.

The sensor system 1 also has a temperature regulation apparatus 8, which at least partially includes the control unit 12.

The temperature regulation apparatus 8 additionally has a temperature regulation element 11, which contains, for example, a Peltier element and is arranged in particular in the surrounding area of the light source 2, so that a source temperature of the light source 2, in particular a barrier-layer temperature of the laser diode, can be regulated by means of the temperature regulation element 11. Depending on the direction of the operating current of the Peltier element, the temperature regulation element 11 can function as a cooling element or as a heating element.

For example, the light source 2 can be arranged on a heat sink or a cooling body 14 for dissipating heat generated by the light source 2.

For example, the temperature regulation element 11 can be connected to the cooling body 14 in order to cool the latter and thus cool the light source 2.

The temperature regulation apparatus 8 additionally has, for example, a first temperature sensor 9, which is arranged such that it can determine a temperature of the filter element 7 and/or can generate a first sensor signal based on the filter temperature. The first temperature sensor 9 is coupled to the control unit 12 in order to transmit the first sensor signal to the control unit 12.

The temperature regulation apparatus 8 additionally has, for example, a second temperature sensor 10, which can generate a second sensor signal in dependence on the source temperature of the light source 2. The second temperature sensor 10 is coupled to the control unit 12 in order to transmit the second sensor signal to the control unit 12.

The second temperature sensor 10 can, for example, likewise be attached to the cooling body 14. Conclusions regarding a barrier-layer temperature of the light source 2, for example, can be drawn from the temperature of the cooling body 14 based on a thermal resistance of the light source 2 and possibly the transition between the cooling body 14 and the light source 2.

Optionally, the sensor system 1 can include a deflection apparatus 13, which can steer 25 the reflected light components 6 of the light 3 onto the active surface of the detectors 5. For this purpose, the deflection apparatus 13 can include, for example, a mirror, in particular a movably mounted or rotatably arranged mirror.

The mode of operation of the sensor system 1 will be explained in more detail below on the basis of a non-limiting example using specific numerical values. Further embodiments follow directly from these explanations.

In the exemplary embodiment, for example a first ambient temperature can be 10° C. During operation of the sensor system 1, this can, for example, result in a first filter temperature $t_{F1}$ of the filter element 7 of 45° C. Since the light source 2 usually heats up more as a result of its operation than the filter element 7, a first source temperature $t_{L1}$, which is greater than the first filter temperature $t_{F1}$, is present there and can be, for example, 60° C.

Figures 2, 3:
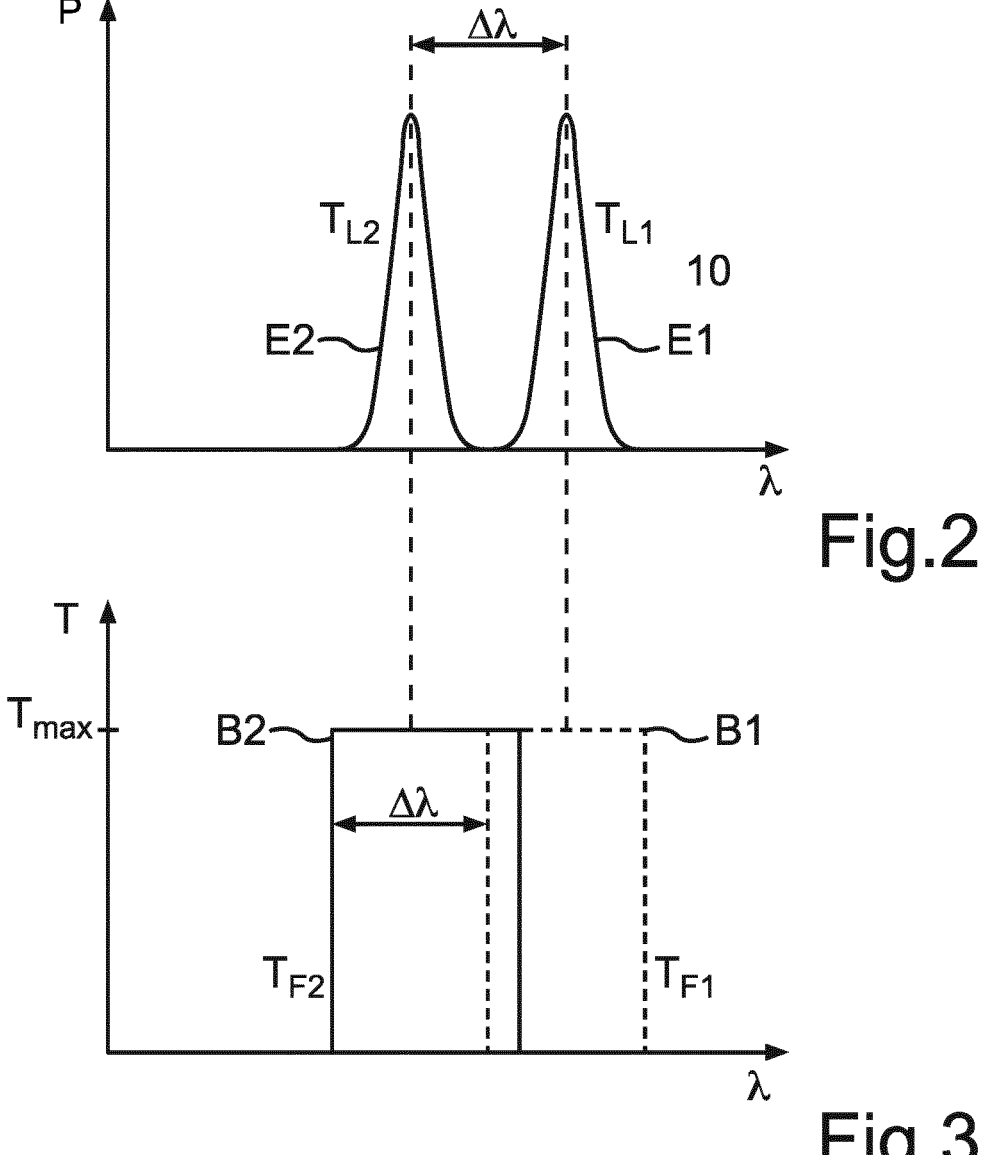
FIG. 2 shows a temperature-dependent shift in an emission wavelength.
FIG. 3 shows a temperature-dependent shift in a transmission spectrum.

The filter element 7 is selected, for example, such that an emission wavelength of the light source 2 at the first source temperature $t_{L1}$ and the first filter element $t_{F1}$ lies within a first filter band B1 of the filter element 7, as shown for example in FIGS. 2 and 3.

FIG. 2 shows schematically a radiation power P of the emitted light 3 of the light source 2 as a function of the wavelength λ. In the case of a laser, the corresponding wavelength distribution has a sharp peak at the emission wavelength, as is indicated in a first emission spectrum E1 of the light source 2. The width of the distribution is shown disproportionately large in FIG. 2.

FIG. 3 shows the transmittance of the filter element 7 as a function of the wavelength λ. In particular, the first transmission band B1 is shown schematically as a rectangular band, wherein in real situations a greater or lesser deviation from the rectangular shape may be present.

In the exemplary embodiment, it is assumed that the ambient temperature decreases from 10° C. to −40° C., for example. In this case, the filter temperature can, for example, decrease to a second filter temperature of, for example, $t_{F2}$=−5° C.

If the source temperature of the light source 2 were not regulated, a source temperature of 10° C., for example, would be present.

The decrease in the filter temperature by 50 K results in a shift of the first transmission band B1 by a value Δλ to a resulting second transmission band B2, as shown schematically in FIG. 3.

The temperature-dependent shift in the transmission band of the filter element 7 can be, for example, of the order of magnitude of 0.05 nm/K, which would result in ΔΔ≈−2.5 nm.

In the case of a laser as the light source 2, a shift in the emission wavelength in dependence on the temperature is initially to be expected, which is significantly greater there than Δλ. For example, the temperature-dependent wavelength shift of the light source 2 can be of the order of magnitude of 0.5 nm/K. Without regulation of the source temperature, this could lead to the emission wavelength moving out of the transmission band of the filter element 7.

The control unit 12 is configured to generate a control signal in dependence on the sensor signals of the temperature sensors 9, 10 and to transmit it to the temperature regulation element 11, with the result that a regulation loop is created, by means of which the control unit 12 regulates the source temperature of the light source 2 according to the filter temperature.

In order to fully or partially compensate the different shift in the transmission spectrum or the emission spectrum, the source temperature can be regulated, for example, which counteracts the change in the source temperature caused by the change in the ambient temperature.

In the specific exemplary embodiment, the source temperature could, for example, be regulated to a second source temperature of $t_{L2}$=45° C. As can be easily checked using the numerical values given above, the result in this case is a shift in the emission spectrum of the light source 2, likewise by Δλ≈−2.5 nm, to a second emission spectrum E2, as shown in FIG. 2.

Consequently, the second emission spectrum E2 lies completely within the transmission band B2 of the filter element 7 even at the ambient temperature of −40° C.

In other embodiments, the source temperature can be regulated to a value between 10° C. and 45° C. in order to at least partially compensate the shift in wavelength.

Accordingly, the width of the transmission band of the filter element 7 can be selected to be significantly smaller than would be possible without temperature regulation according to the improved concept.

As has been described, a signal-to-noise ratio can thereby be increased for the measurement by means of the sensor system, which increases the accuracy and reliability of the sensor system.

A further additional positive side effect of the greater cooling of the light source can be, for example, a resulting extended service life of the light source.

The invention claimed is:

1. An active optical sensor system with a temperature regulation, the active optical sensor system comprising:
   a light source, which is configured to emit light in a direction of an object;
   at least one optical detector, which is configured to detect components of the light reflected by the object;
   an optical filter element arranged in a receiving beam path for the components of the light reflected by the object; and
   a temperature regulation apparatus, which is configured to regulate a source temperature of the light source in dependence on a filter temperature of the optical filter element.

2. The active optical sensor system as claimed in claim 1, wherein the temperature regulation apparatus comprises:
   a first temperature sensor, which is configured and arranged to generate a first sensor signal that is dependent on the filter temperature; and
   a second temperature sensor, which is configured and arranged to generate a second sensor signal that is dependent on the source temperature;
   wherein the temperature regulation apparatus is configured to regulate the source temperature in dependence on the first sensor signal and the second sensor signal.

3. The active optical sensor system as claimed in claim 2, wherein the temperature regulation apparatus is configured to:
   determine a setpoint value for the source temperature in dependence on the first sensor signal; and
   regulate the source temperature to the setpoint value in dependence on the second sensor signal.

4. The active optical sensor system as claimed in claim 1, wherein the temperature regulation apparatus is configured to regulate the source temperature in dependence on a specified first parameter, which describes a temperature-dependent shift in a characteristic wavelength of the light source.

5. The active optical sensor system as claimed in claim 1, wherein the temperature regulation apparatus is configured to regulate the source temperature in dependence on a specified second parameter, which describes a temperature-dependent shift in at least one characteristic wavelength of the optical filter element.

6. The active optical sensor system as claimed in claim 1, wherein the temperature regulation apparatus is configured to regulate the source temperature in such a way that a temperature-dependent shift in at least one characteristic wavelength of the optical filter element is compensated by a temperature-dependent shift in a characteristic wavelength of the light source.

7. The active optical sensor system as claimed in claim 1, wherein the optical filter element has a layer arranged on an active surface of the at least one optical detector.

8. The active optical sensor system as claimed in claim 1, wherein the optical filter element comprises a bandpass filter, and an emission wavelength of the light source at a specified reference temperature lies within a band of the bandpass filter.

9. A method for regulating a temperature of an active optical sensor system, the method comprising:
   emitting light by a light source in a direction of an object;
   detecting components of the light reflected by the object; and
   regulating a source temperature of the light source by a temperature regulation apparatus in dependence on a filter temperature of an optical filter element arranged in a receiving beam path for the components of the light reflected by the object.

10. The method as claimed in claim 9, further comprising:

generating a first sensor signal in dependence on the filter temperature;

generating a second sensor signal in dependence on the source temperature; and regulating the source temperature by the temperature regulation apparatus in dependence on the first sensor signal and the second sensor signal.

11. The method as claimed in claim 10, further comprising:

determining a setpoint value for the source temperature in dependence on the first sensor signal; and regulating the source temperature to the setpoint value in dependence on the second sensor signal.

12. The method as claimed in claim 9, wherein the source temperature is regulated in dependence on:

a specified first parameter, which describes a temperature-dependent shift in a characteristic wavelength of the light source; and/or a specified second parameter, which describes a temperature-dependent shift in at least one characteristic wavelength of the optical filter element.

13. The method as claimed in claim 9, wherein a temperature-dependent shift in at least one characteristic wavelength of the optical filter element is compensated by generating a corresponding shift in a characteristic wavelength of the light source by regulating the source temperature.

\* \* \* \* \*